(12) United States Patent
Sarin

(10) Patent No.: US 11,461,770 B2
(45) Date of Patent: Oct. 4, 2022

(54) ACTIVE APPLICATION OF SECONDARY TRANSACTION INSTRUMENT TOKENS FOR TRANSACTION PROCESSING SYSTEMS

(71) Applicant: PAYPAL, INC., San Jose, CA (US)

(72) Inventor: Pankaj Sarin, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 187 days.

(21) Appl. No.: 17/006,086

(22) Filed: Aug. 28, 2020

(65) Prior Publication Data

US 2022/0067712 A1  Mar. 3, 2022

(51) Int. Cl.
*G06Q 20/00* (2012.01)
*G06Q 20/36* (2012.01)

(52) U.S. Cl.
CPC ..... *G06Q 20/3674* (2013.01); *G06Q 20/3676* (2013.01); *G06Q 20/3678* (2013.01)

(58) Field of Classification Search
USPC ................................ 705/16, 21; 380/44, 262
See application file for complete search history.

(56) References Cited

U.S. PATENT DOCUMENTS

2014/0316981 A1  10/2014 Muthukrishnan et al.
2015/0339667 A1  11/2015 Dua
2019/0147515 A1  5/2019 Hurley et al.
2020/0184466 A1  6/2020 Sarin
2021/0383374 A1*  12/2021 Liberty ............... H04L 63/0823

OTHER PUBLICATIONS

International Search Report and Written Opinion dated Nov. 3, 2021 (8 Pgs).

* cited by examiner

*Primary Examiner* — Dante Ravetti
(74) *Attorney, Agent, or Firm* — Haynes and Boone, LLP

(57) ABSTRACT

Systems and methods for active application of secondary transaction instrument tokens in transaction processing systems are provided. A transaction processing server receives a transaction request identifying a request to authorize a transaction using a first transaction instrument and a first token processing engine issues the transaction request with a first transactable token associated with the first transaction instrument for use by a first remote entity to authorize the first transaction instrument. The transaction processing server receives a transaction request failed message and actively routes a non-transactable token from the first token processing engine to a second token processing engine. The second token processing engine reissues the transaction request with a second transactable token associated with the second transaction instrument for use by a second remote entity to authorize the second transaction instrument and receives an indication that the transaction completed successfully using the second transactable token.

20 Claims, 7 Drawing Sheets

ACTIVE APPLICATION OF SECONDARY TRANSACTION INSTRUMENT TOKENS FOR TRANSACTION PROCESSING SYSTEMS

TECHNICAL FIELD

The present application generally relates to transaction processing systems and methods, and in particular to active application of secondary transaction instrument tokens for transaction processing systems.

BACKGROUND

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider. Such payment service providers can make transactions easier and safer for the parties involved. For example, in order to secure sensitive financial data during transaction processing, a token may be issued for that data, where the token does not reveal the financial data. Instead, a backend tokenization process allows for retrieval of the sensitive data during transaction processing but does not allow for bad actors to determine the data from the token itself. Purchasing with the assistance of a payment service provider from the convenience of virtually anywhere using a mobile device is one main reason why on-line and mobile purchases are growing very quickly.

Typically, when a user requests a payment transaction (e.g., of a purchase transaction) using a particular payment application provided by a payment service provider, a particular transaction instrument already linked with that particular payment application is used for the payment transaction. When the particular transaction instrument fails (e.g., because of an insufficient balance), the payment transaction fails. If the user wishes to use another transaction instrument that is already linked to that particular payment application for that payment transaction, they usually must go through the process of manually selecting a new transaction instrument to that payment application. Such inconvenience can introduce human errors from manual inputs and discourages users from making purchases and lead to lost sales for merchants.

Figure 1:
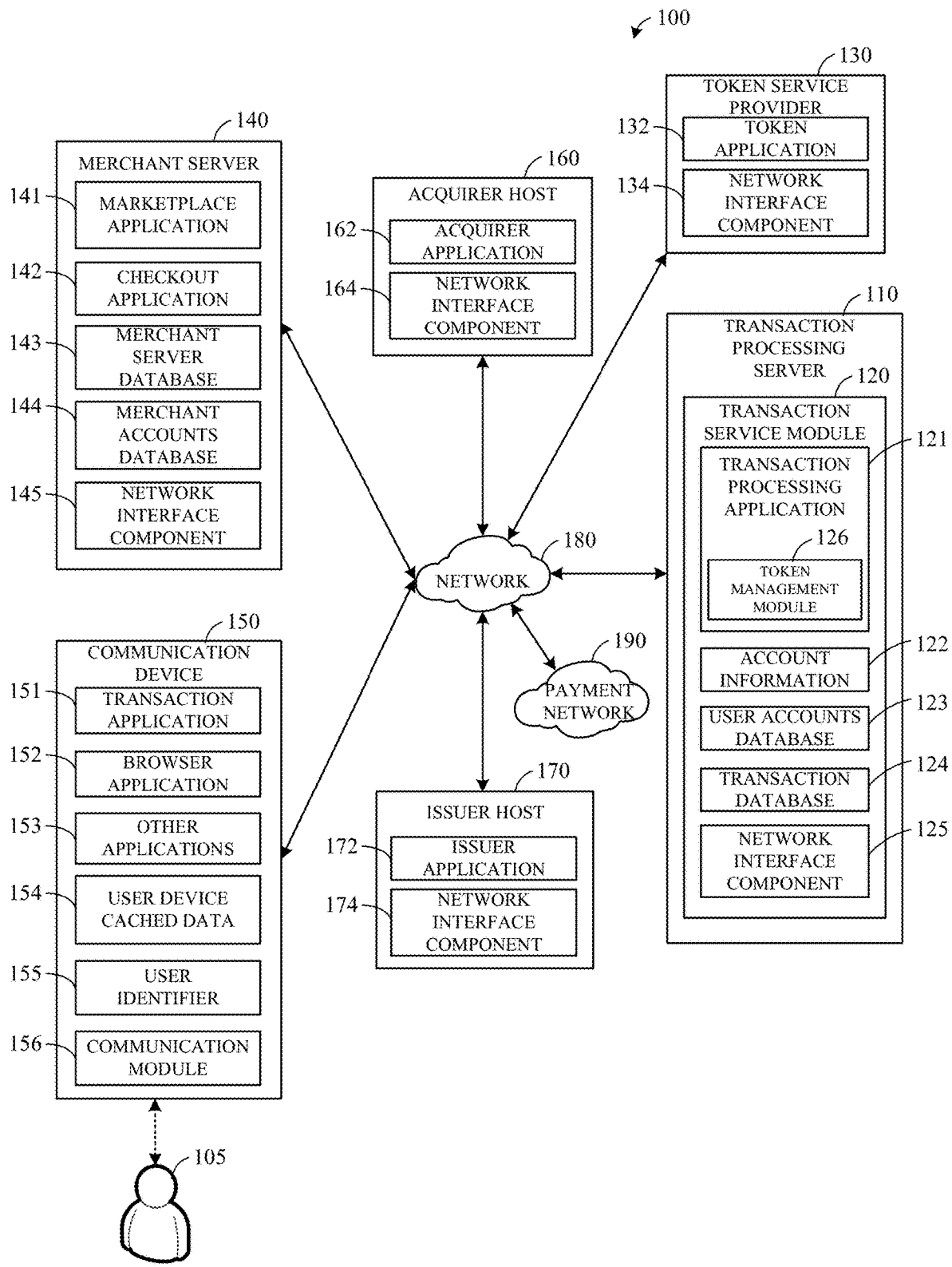
FIG. 1 illustrates a block diagram of a networked system suitable for implementing the processes described herein, according to an implementation of the present disclosure.

Implementations of the present disclosure and their advantages are best understood by referring to the detailed description that follows. It should be appreciated that like reference numerals are used to identify like elements illustrated in one or more of the figures, wherein showings therein are for purposes of illustrating implementations of the present disclosure and not for purposes of limiting the same.

DETAILED DESCRIPTION

The present disclosure describes systems and methods for providing secure electronic payments using both primary and secondary transaction instruments. As discussed above, typically, in a payment application, when a payment transaction using a particular transaction instrument linked to the application (a primary transaction instrument) fails (e.g., because of an insufficient balance), that payment transaction fails. If the user wishes to make the payment using another transaction instrument that is not already linked to that particular payment application (a secondary transaction instrument), they usually must go through the process of providing a new transaction instrument to that payment application. Such inconvenience can discourage users from making purchases and lead to lost sales for merchants. However, in implementations of the systems and methods described herein, a service provider may apply secondary transaction instruments already linked with that payment application (e.g., by routing a non-transactable token between transaction instruments) and perform a new payment transaction using the secondary transaction instrument linked with that payment application for retrying a prior unsuccessful transaction without user input or action. As such, human mistakes that may occur when a user manually provides transaction instruments to the payment application are reduced, and the user experience is enhanced. The payment system may use various data security techniques (e.g., encryption, tokenization, smart contract using blockchain, etc.) to improve transaction security.

The subject technology provides for active application of secondary transaction instrument tokens for transaction processing systems. For example, the transaction processing server 110 can serve a received transaction request from the communication device 150 that includes a request to authorize a transaction by communicating the transaction request to a remote server (e.g., the issuer host 170) using a first transactable token and actively routing a non-transactable token internally to automatically switch from the first transactable token to a second transactable token when the first transactable token fails to authorize the transaction. In this respect, the transaction processing server 110 can facilitate in increasing the authorization rate of transactions by attempting to re-run a transaction request using secondary transaction instrument tokens when primary transaction instrument tokens cannot result in a successful completion of the transaction. As used herein, the term "transactable token" can refer to a token that is shared with a remote entity and acted upon by the remote entity for processing and authorizing a transaction. As used herein, the term "non-transactable token" can refer to a token that is not shared with the remote entity and maintained internally within the transaction processing system for routing between transaction instruments and triggering new transaction authorization requests independent of any user interaction.

The subject technology provides several benefits in transaction processing systems such as reduced system latency response, reduced network traffic overhead, and reduced system memory consumption. The subject technology can achieve reduced system latency response as a result of actively routing secondary transaction instrument tokens by automatically detecting a failed transaction condition from the authorizing entity and reattempting the transaction using a new transactable token without the need of prompting the user to either submit new payment information and/or obtain user authorization to proceed with the transaction reattempt. The subject technology can achieve reduced traffic network overhead by omitting the need to contact the issuer in unnecessary transaction reattempts using the same transactable token and/or same transaction instrument after a failed attempt and thereby create unnecessary signaling over the network. The active application of a secondary transaction instrument token within the system of the subject technology can help minimize the amount of traffic needed to set up and/or trigger a new transaction attempt using a different transaction instrument. The subject technology can reduce system memory consumption by minimizing the amount of information needed to trigger a transaction reattempt. The non-transactable token may contain at least a portion of the transactable token and may be comprised of transaction metadata and digital signature information that is significantly smaller in size compared to the transactable token size and/or transaction set up signaling after a failed transaction attempt.

FIG. 1 is a block diagram of a networked electronic transaction system 100 suitable for implementing the processes described herein, according to an implementation of the present disclosure. The electronic transaction system 100 includes a transaction processing server 110 associated with an electronic payment provider, a merchant server 140, and a communication device 150 that may be communicatively coupled with each other via a network 180. The electronic transaction system 100 also includes a token service provider 130, an acquirer host 160, an issuer host 170 and a payment network 190, communicably coupled to the transaction processing server 110 via the network 180. In some implementations, the transaction processing server 110 may be communicably coupled directly to each of the acquirer host 160 and/or the issuer host 170. The network 180, in one implementation, may be implemented as a single network or a combination of multiple networks. For example, in various implementations, the network 180 may include the Internet and/or one or more intranets, landline networks, wireless networks, and/or other appropriate types of communication networks. In another example, the network 180 may include a wireless telecommunications network (e.g., cellular phone network) adapted to communicate with other communication networks, such as the Internet.

The transaction processing server 110, in one implementation, may be maintained by a transaction processing entity or an electronic service provider, which may provide electronic services (e.g., selling of merchandise processing, purchasing of merchandise, performing electronic transactions, etc.). As such, the transaction processing server 110 may include a transaction service module 120, which may be adapted to interact with the communication device 150 and/or the merchant server 140 over the network 180 to facilitate the searching, selection, purchase, payment of items, and/or other services offered by the transaction processing server 110. In one example, the transaction processing server 110 may be provided by PayPal®, Inc. of San Jose, Calif., USA, and/or one or more financial institutions or a respective intermediary that may provide multiple point of sale devices at various locations to facilitate transaction routings between merchants and, for example, financial institutions. In various implementations, the transaction service module 120 includes a transaction processing application 121, account information 122, a user accounts database 123, transaction database 124, and a network interface component 125. The transaction processing application 121 includes a token management module 126.

In some implementations, the transaction processing application 121 is adapted to process purchases and/or payments for financial transactions between a user and a merchant. In one implementation, the transaction processing application 121 assists with resolving financial transactions through validation, delivery, and settlement. As such, the transaction processing application 121 settles indebtedness between a user and a merchant, in which accounts may be directly and/or automatically debited and/or credited of monetary funds in a manner as accepted by the banking industry.

In certain implementations, the transaction processing application 121 may allow for a user to conduct one or more transactions using the application and the electronic device. Such an application may be, for example, a dedicated purchasing application linked with a merchant (e.g., Nordstrom®) and/or a payment service (e.g., PayPal® or Venmo®). The transaction processing application 121 may be a single application or a plurality of separate applications linked together. Thus, for example, the transaction processing application 121 may be a combination of a purchasing application, a payment application, and a communication application. In various implementations, the transaction processing application 121 may also include financial applications, such as banking, online payments, money transfer, or other applications.

The token management module 126 may correspond to one or more processes to execute software modules and associated specialized hardware of transaction processing server 110 to serve a received transaction request from the communication device 150 that includes a request to authorize a transaction by communicating the transaction request to a remote server (e.g., the issuer host 170) using a first transactable token and actively route a non-transactable token internally to automatically switch use from the first transactable token to a second transactable token when the first transactable token fails to authorize the transaction. In this respect, the token management module 126 can facilitate in increasing the authorization rate of transactions by attempting to re-run a transaction request using secondary transaction instrument tokens when primary transaction instrument tokens cannot result in a successful completion of the transaction.

In some implementations, the token management module 126 receives, through the network interface component 125 from the communication device 150, a transaction request identifying a request to authorize a transaction using a first transaction instrument. In one or more implementations, the token management module 126 can receive, through the network interface component 125 from the communication device 150, a first set of tokens associated with the first transaction instrument and a second set of tokens associated with the second transaction instrument. For example, the first set of tokens may correspond to tokens issued for a VISA™ payment network and the second set of tokens may correspond to tokens issued for a MASTERCARD™ payment network. In various aspects, each of the first set of tokens and the second set of tokens includes a respective ratio of a predetermined number of transactable tokens to a predetermined number of non-transactable tokens. In some aspects, each transactable token of the first set of tokens includes an encoded representation of the first transaction instrument and each transactable token of the second set of tokens includes an encoded representation of the second transaction instrument. For example, the encoded representation may correspond to a credit card number, a credit card security code and/or a credit card expiration date. In one or more implementations, the token management module 126 can store a first ratio of the predetermined number of transactable tokens to the predetermined number of non-transactable tokens associated with the first transaction instrument in a first data structure. The token management module 126 can store a second ratio of the predetermined number of transactable tokens to the predetermined number of non-transactable tokens associated with the second transaction instrument in a second data structure. In some aspects, the token management module 126 may store the first set of tokens in a first data structure of the user accounts database 123 and the second set of tokens in a second data structure of the user accounts database 123.

In one or more implementations, the token management module 126 can receive, through the network interface component 125 from the communication device 150, device data indicating one or more device metrics of the communication device 150. In some examples, the device data can indicate the storage capacity of the communication device 150 and/or the power consumption level (e.g., battery power level) of the communication device 150. The token management module 126 can determine whether the one or more device metrics is lesser than a predetermined threshold. The token management module 126 can modify the ratio of the predetermined number of transactable tokens to the predetermined number of non-transactable tokens when the one or more device metrics is determined to be lesser than the predetermined threshold. For example, if any of the device metrics falls below the threshold (e.g., battery power too low or storage almost full), then the number of tokens that the communication device 150 can handle may be decreased to facilitate the reduced performance of the communication device 150.

In one or more implementations, the token management module 126 can communicate, through the network interface component 125 to one or more of the first remote entity or the second remote entity, a request for a new set of tokens that includes the modified ratio of the predetermined number of transactable tokens to the predetermined number of non-transactable tokens to be reissued via an asynchronous message exchange. In some aspects, the request may include a request to the remote entity to lock and/or expire any existing tokens and request new tokens at the lower ratio to be reissued through an asynchronous message exchange. The token management module 126 can send, through the network interface component 125 to the communication device 150, an asynchronous message that includes the new set of tokens.

The token management module 126 provides, through the network interface component 125 to a first remote entity, using a first token processing engine, the transaction request with a first transactable token associated with the first transaction instrument for use by the first remote entity to authorize the first transaction instrument. For the example, the token management module 126 may communicate with the issuer host 170, the first transactable token or at least a portion thereof, that is associated with the first transaction instrument (e.g., a credit card for a certain payment network such as VISA™). If the first transactable token is not a valid token, the token management module 126 can receive, through the network interface component 125 from the first remote entity, a transaction request failed message associated with the transaction request. The transaction request failed message may indicate that the processing of the transaction using the first transactable token failed. For example, the transaction may fail authorization due to certain reasons, such as card read error, transaction processing device issues, risk related concerns, etc. In response to receipt of the transaction request failed message, the subject technology provides for relaying the transaction information via another linked transaction instrument using a specialized secured designated token, such as a non-transactable token.

The token management module 126 can associate the transaction request with a second transaction instrument by routing a non-transactable token from the first token processing engine to a second token processing engine. In this respect, the non-transactable token is routed internally within the transaction processing server 110 and is not transacted by any other third-party entity (or remote entity) outside the transaction processing server 110. In some aspects, the non-transactable token includes at least a portion of the first transactable token. For example, the non-transactable token may include metadata of the first transactable token including a share risk code generated by the token management module 126.

The token management module 126 provides, through the network interface component 125 to a second remote entity, using the second token processing engine, the transaction request with a second transactable token associated with the second transaction instrument for use by the second remote entity to authorize the second transaction instrument. In this respect, the token management module 126 automatically re-attempts the transaction request with a different issuer to have the transaction processed with a different token without interaction with (or intervention by) the user 105.

The token management module 126 can receive, through the network interface component 125 from the second remote entity, an indication associated with the transaction request based on the second transactable token. In receiving the indication, the token management module 126 can receive, through the network interface component 125 from the second remote entity, a transaction request successful message indicating that the transaction is authorized using the second transactable token. In turn, the token management module 126 can provide, through the network interface component 125 to the communication device 150, a transaction completion message indicating that the transaction completed successfully.

In one or more implementations, the token management module 126 can generate transaction metadata based on the receiving of the transaction request successful message. In some aspects, the transaction metadata includes one or more of an encoded user identifier associated with the communication device 150, a session identifier associated with the transaction, the first transactable token, the second transactable token, or the non-transactable token. The token management module 126 can receive, through the network interface component 125 from the token service provider 130, one or more refresh tokens associated with the first transaction instrument and the second transaction instrument. The token management module 126 can store the one or more refresh tokens in a data structure for each of the first transaction instrument and the second transaction instrument according to a predetermined ratio of transactable tokens to non-transactable tokens based on the transaction metadata. In some aspects, the one or more refresh tokens are used to reissue one or more of the first transactable token, the second transactable token or the non-transactable token. In some aspects, the token management module 126 can provide, through the network interface component 125 to the communication device 150, the transaction completion message that includes the one or more refresh tokens.

In some implementations, a set of transactable tokens and/or non-transactable tokens may be received by the token management module 126 from the communication device 150. Once received, the token management module 126 may load the set of transactable tokens and/or non-transactable tokens to a local storage in the token management module 126 while the communication device 150 is in contact with transaction processing server 110 over the network 180.

The transaction processing application 121 may further include processes used to perform electronic transaction processing for a payment to the merchant server 140 or a transfer to a second communication device (not shown). During processing of a payment or transfer transaction, transaction processing application 121 may be utilized to select transaction instrument(s) for use in providing payment for a purchase transaction, transfer, or other financial process. As discussed herein, transaction processing application 121 may utilize user financial information, such as a credit card, bank account, or other financial account, as a transaction instrument when providing payment information, which may require tokenization. Additionally, transaction processing application 121 may utilize a digital wallet stored with an account with the transaction processing server 110, such as token management module 126, as the transaction instrument, for example, through accessing a digital wallet or account of a user with token management module 126 through entry of authentication credentials and/or by providing a data token that allows for processing using the account.

In some implementations, the transaction processing application 121 may utilize a token stored in a data structure by the token management module 126 or token service provider 130 prior to initiation of transaction processing. This token may correspond to a transactable token stored by token management module 126. Such transaction processing may be done through the token management module 126 receiving transaction information and retrieving a set of transactable tokens. Additionally, the token management module 126 may hold the value for the transaction amount in escrow during use of the transactable token so that the value may be utilized to pay for any transactions processed using the transactable token. In such implementations, merchant server 140 may approve the transaction based on the data and/or digital signature that authorizes the user 105 for use of the transaction amount. In some aspects, the token management module 126 may utilize a non-transactable token to route information of the first transactable token between token processing engines that are respectively associated with different transaction instruments to automatically utilize a second transactable token when the processing of a transaction using the first transactable transaction token failed to receive authorization (or did not complete successfully).

The transaction service module 120, in one implementation, may be adapted to maintain one or more user accounts, merchant accounts, and transaction records in the user accounts database 123. As such, the user accounts database 123 may store account information associated with one or more individual users (e.g., the user associated with communication device 150) and merchants and transaction data associated with transactions. For example, account information may include private financial information of users and merchants, such as one or more account numbers, passwords, credit card information, banking information, digital wallets used, or other types of financial information. The transaction records may include Internet Protocol (IP) addresses, device information associated with the transaction, transaction dates, transaction amounts, payor identities, payee identities, etc. In certain implementations, account information also includes user purchase profile information such as account funding options and payment options associated with the user, payment information, receipts, and other information collected in response to completed funding and/or payment transactions.

In some aspects, each of the user accounts stored in the user accounts database 123 may include account information 122 associated with consumers, merchants, and funding sources, such as credit card companies. For example, account information 122 may include private financial information of users of devices such as account numbers, passwords, device identifiers, usernames, phone numbers, credit card information, bank information, or other financial information which may be used to facilitate online transactions by user 105. In some implementations, the user 105 and/or the merchant server 140 may establish one or more digital wallets and/or accounts with the transaction processing server 110. Digital wallets and/or accounts can be stored in the user accounts database 123 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to the transaction processing server 110, e.g., from communication device 150, one or more digital wallets and/or payment accounts belonging to the users may be found. The user accounts database 123 may also store the user preferences for an account for the user and/or merchant. The user accounts database 123 may also store transaction information and/or preauthorized tokens.

Advantageously, the transaction service module 120 may be adapted to interact with merchant server 140 on behalf of user 105 during a transaction with the checkout application 142 to track and manage purchases made by users and which and when funding sources are used.

The transaction processing application 121, which may be part of transaction service module 120 or separate, may be configured to receive information from the communication device 150 and/or merchant server 140 for processing and storage in the transaction database 124. The transaction processing application 121 may include one or more applications to process information from user 105 for processing an order and payment using various selected transaction instruments, as described herein. As such, transaction processing application 121 may store details of an order from individual users, including funding source used, credit options available, etc. The transaction service module 120 may be further configured to determine the existence of and to manage accounts for user 105, as well as create new accounts if necessary.

In various implementations, transaction processing server 110 includes at least one network interface component 125 adapted to communicate with merchant server 140 and/or other entities over network 180. In various implementations, network interface component 125 may include a modem, an Ethernet device, a broadband device, a satellite device and/or various other types of wired and/or wireless network communication devices including microwave, radio frequency (RF), and infrared (IR) communication devices. In some aspects, the network interface component 125 includes an application programming interface.

Merchant server 140 may include a merchant server database 143 identifying available products and/or services (e.g., collectively referred to as items) made available by, or on behalf of, a merchant associated with the communication device 150, for viewing and purchase by a non-merchant user device (not shown). According to various aspects of the present disclosure, the merchant server 140 may also host a website for an online marketplace, where sellers and buyers may engage in purchasing transactions with each other. The descriptions of the items or products offered for sale by the merchants (also referred to as "sellers") may be stored in the merchant server database 143. The merchant may have a physical point-of-sale (POS) store front. The merchant may be a participating merchant who has a merchant account with an online marketplace provider via the merchant server 140 and a user account with the electronic payment provider via the transaction processing server 110. Merchant server 140 may be used for POS or online purchases and transactions. The merchant server 140, in various implementations, may be maintained by a business entity (or in some cases, by a partner of a business entity that processes transactions on behalf of business entity).

Examples of businesses entities include an online marketplace sites, merchant sites, resource information sites, utility sites, real estate management sites, social networking sites, etc., which offer various items for purchase and process payments for the purchases. Generally, merchant server 140 may be maintained by anyone or any entity that receives money, which includes charities as well as retailers and restaurants. For example, a purchase transaction may be payment or gift to an individual. Although only one merchant server is shown, a plurality of merchant servers may be utilized if the user is purchasing products from multiple merchants.

The merchant server 140, in one implementation, may include a marketplace application 141, which may be adapted to provide information over the network 180 to the network interface component 145 of the communication device 150. For example, the user of the communication device 150 may interact with the marketplace application 141 through the network interface component 145 over the network 180 to search and view various items available for purchase in the merchant server database 143.

Merchant server 140 also may include a checkout application 142 which may be configured to facilitate the purchase by a user of goods or services online or at a physical point-of-service (POS) or store front. Checkout application 142 may be configured to accept payment information from or on behalf of the user through transaction processing server 110 over the network 180. For example, checkout application 142 may receive and process a payment confirmation from the transaction processing server 110 via the transaction service module 120, as well as transmit transaction information to the transaction service module 120 and receive information from the transaction service module 120 (e.g., a transaction ID). Checkout application 142 may be configured to receive payment via a plurality of payment methods including cash, credit cards, debit cards, checks, money orders, or the like.

Merchant server 140 may further include the merchant server database 143 stored on a transitory and/or non-transitory memory of communication device 150, which may store various applications and data and be utilized during execution of various modules of communication device 150. Merchant server database 143 may include, for example, identifiers such as operating system registry entries, cookies associated with marketplace application 141, identifiers associated with hardware of communication device 150, or other appropriate identifiers, such as identifiers used for payment/user/device authentication or identification, which may be communicated as identifying the user/communication device 150 to transaction processing server 110. Merchant server database 143 may further include any transaction data sets used for training and/or processing with a machine learning model generated by transaction processing server 110.

The merchant accounts database 144 may be adapted to store information about merchant accounts registered to merchant devices, including the communication device 150. The merchant accounts may be indicative of the merchant devices having access to a service provided by the merchant server 140. The merchant accounts database 144, in one implementation, may include at least one merchant identifier (not shown), which may be included as part of the one or more items made available for purchase so that, e.g., particular items are associated with the particular merchants. In one implementation, the merchant identifier may include one or more attributes and/or parameters related to the communication device 150, such as business and banking information. The merchant identifier may include attributes related to the merchant server 140, such as identification information (e.g., a serial number, a location address, GPS coordinates, a network identification number, etc.).

Merchant server 140 includes at least one network interface component 145 adapted to communicate with transaction processing server 110. In various implementations, network interface component 145 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Network 180 may be implemented as a single network or a combination of multiple networks. For example, in various implementations, network 180 may include the Internet or one or more intranets, landline networks, wireless networks, and/or other appropriate types of networks. Thus, network 180 may correspond to small scale communication networks, such as a private or local area network, or a larger scale network, such as a wide area network or the Internet, accessible by the various components of the electronic transaction system 100.

Still referring to FIG. 1, the payment network 190 may be operated by payment card service providers or card associations, such as DISCOVER™, VISA™, MASTER-CARD™, AMERICAN EXPRESS™, RUPAY™, CHINA UNION PAY™ etc. The payment card service providers may provide services, standards, rules, and/or policies for issuing various payment cards. A network of communication devices, servers, and the like also may be established to relay payment related information among the different parties of a payment transaction.

Token service provider 130 may correspond to a service provider that issues tokens (e.g., transactable tokens and/or non-transactable tokens) from a token vault, where the tokens are used to replace sensitive funding source information with a randomized identifier in order to protect the data during transmission and processing. Thus, token service provider 130 may provide generation of tokens, issuance to token management module 126, and lifecycle of such tokens, which includes rules and other limitations of use and validity of the tokens. Token service provider 130 may be availed to issue a token for sensitive data prior to transaction processing between communication device 150 and merchant server 140 so that a transactable token may be stored on the token management module 121. The transactable token may have validity rules and a lifecycle issued to communication device 150 by the token service provider 130. Token service provider 130 may re-issue the transactable and/or non-transactable tokens at expiration of the tokens based on a request from token management module 126. In some implementations, the token service provider 130 may issue refresh tokens after a number of uses of the transactable tokens and/or non-transactable tokens. In some aspects, the token service provider 130 may issue the refresh tokens automatically to the token management module 126 in order to maintain a ratio of transactable tokens to non-transactable tokens.

The token service provider 130 may generate the token using the data with account information for the user 105, such as identifiers for a digital wallet of the user 105. For example, the transactable token may be generated with digital wallet information and limits on use of the digital wallet (e.g., a maximum preauthorized amount for the transactions processed using the transactable token) so that the token may identify the user account when the token management module 126 processes a transaction using the transactable token and allow a payment to be made in accordance with the limits of use of the transactable token from the user account. The digital token may be encrypted so that data in the transactable token is not capable of being determined using a third party receiving the transactable token without encryption keys of the user 105.

The acquirer host 160 includes an acquirer application 162 and a network interface component 164, and is communicably coupled to the transaction processing server 110 and/or the merchant server 140 through the network interface component 164 over the network 180. The acquirer host 160 may be a server operated by an acquiring bank. An acquiring bank is a financial institution that accepts payments on behalf of merchants. For example, a merchant may establish an account at an acquiring bank to receive payments made via various payment cards for a certain payment network (e.g., VISA™, MASTERCARD™) through the acquirer application 162. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

The issuer host 170 includes an issuer application 172 and a network interface component 174 and is communicably coupled to the transaction processing server 110 and/or the merchant server 140 through the network interface component 174 over the network 180. The issuer host 170 may be a server operated by an issuing bank or issuing organization of payment cards for a certain payment network (e.g., VISA™) through the issuer application 172. The issuing banks may enter into agreements with various merchants to accept payments made using the payment cards. The issuing bank may issue a payment card to a user after a card account has been established by the user 105 at the issuing bank. The user then may use the payment card to make payments at or with various merchants who agreed to accept the payment card.

The communication device 150, in various implementations, may be implemented using any appropriate combination of hardware and/or software configured for wired and/or wireless communication over the network 180. In various implementations, the communication device 150 may be implemented using any appropriate hardware and software configured for wired and/or wireless communication over network 180. For example, in one implementation, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data.

The communication device 150 may install and execute a transaction application 151 received from the transaction processing server 110 to facilitate one or more transaction processes (e.g., point-of-sale transactions). The transaction application 151 may allow a user to send payment transaction requests to the transaction processing server 110, which includes communication of data or information needed to complete the request, such as funding source information.

User device 150 may include one or more browser applications 152 that may be used, for example, to provide a convenient interface to permit user 105 to browse information available over network 180. For example, in one implementation, browser application 152 may be implemented as a web browser configured to view information available over the Internet, such as a user account for online shopping and/or merchant sites for viewing and purchasing goods and/or services.

The communication device 150, in various implementations, may include other applications 153 as may be desired in one or more implementations of the present disclosure to provide additional features available to the user. For example, other applications 153 may include security applications for implementing server-side security features, programmatic client applications for interfacing with appropriate APIs over network 180, or other types of applications. Other applications 153 may also include email, texting, voice and IM applications that allow a user to send and receive emails, calls, texts, and other notifications through network 180. In various implementations, other applications 153 may include financial applications, such as banking, online payments, money transfer, or other applications associated with transaction processing server 110. Other applications 153 includes a software program, such as a graphical user interface (GUI), executable by a processor that is configured to interface to a user.

The communication device 150 may further include user device cached data 154 stored to a transitory and/or non-transitory memory of communication device 150, which may store various applications and data and be utilized during execution of various modules of communication device 150. Thus, user device cached data 154 may include, for example, identifiers such as operating system registry entries, cookies associated with browser application 152 and/or other applications 153, identifiers associated with hardware of communication device 150, or other appropriate identifiers, such as identifiers used for payment/user/device authentication or identification, which may be communicated as identifying communication device 150 to merchant server 140. In various implementations, account information and/or digital wallet information may be stored to user device cached data 154 for use by communication device 150.

The communication device 150, in one implementation, may include at least one user identifier 155, which may be implemented, for example, as operating system registry entries, cookies associated with the communication module 156, identifiers associated with hardware of the communication device 150 (e.g., a media control access (MAC) address), or various other appropriate identifiers. The user identifier 155 may include one or more attributes related to the user of the communication device 150, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the user identifier 155 may be passed with a user login request to the transaction processing server 110 via the network 180, and the user identifier 155 may be used by the transaction processing server 110 to associate the user with a particular user account maintained by the transaction processing server 110.

In conjunction with the user identifier 155, communication device 150 may also include a trusted zone owned or provisioned by the transaction processing server 110 with agreement from a device manufacturer. The trusted zone may also be part of a telecommunications provider smart card that is used to store appropriate software by the transaction processing server 110 capable of generating secure industry standard payment credentials as a proxy to user payment credentials.

User device 150 includes at least one communication module 156 adapted to communicate with the merchant server 140 and/or the transaction processing server 110. In various implementations, communication module 156 may include a modem, an Ethernet device, a broadband device, a satellite device and/or various other types of wired and/or wireless network communication devices including microwave, radio frequency, infrared, Bluetooth, and near field communication devices.

Even though only one communication device 150 is shown in FIG. 1, it has been contemplated that one or more user devices (each similar to communication device 150) may be communicatively coupled with the transaction processing server 110 via the network 180 within the networked electronic transaction system 100.

The communication device 150 may also use the merchant server 140 to communicate with the transaction processing server 110 over the network 180. For example, the communication device 150 may use the merchant server 140 to communicate with the transaction processing server 110 in the course of various services offered by the service provider to a merchant, such as a payment intermediary between customers of the merchant and the merchant itself. For example, the merchant server 140 may use an API that allows it to offer sale of goods in which customers are allowed to make payment through the transaction processing server 110, while the user may have an account with the transaction processing server 110 that allows the user to use the transaction processing server 110 for making payments to merchants that allow use of authentication, authorization, and payment services of the service provider as a payment intermediary. The merchant may also have an account with the transaction processing server 110. Even though only one merchant server 140 is shown in FIG. 1, it has been contemplated that one or more merchant servers (each similar to merchant server 140) may be communicatively coupled with the transaction processing server 110 and the communication device 150 via the network 180 in the electronic transaction system 100.

Browser application 152 may correspond to one or more processes to execute modules and associated specialized hardware of communication device 150 that provides an interface and/or online marketplace to sell one or more items offered by a merchant (not shown) associated with communication device 150, and further provide checkout and payment processes for a transaction to purchase the items for sale from the merchant corresponding to communication device 150, where such transaction processing services may be provided through transaction service module 120. In this regard, browser application 152 may correspond to specialized hardware and/or software of communication device 150 to provide a convenient interface to permit a merchant to offer items for sale. For example, browser application 152 may be implemented as an application offering items for sale that may be utilized by the merchant or a merchant employee to enter items selected by a user to a transaction, determine a price for the transaction, and initiate a checkout and payment process for the transaction.

In certain implementations, browser application 152 may correspond to a website available over the Internet and/or online content and/or database information accessible through a dedicated application. Thus, browser application 152 may provide item sales through an online marketplace using the website of the merchant. However, in other implementations, communication device 150 may be local to a physical merchant location and provide transaction processing processes through interfaces displayed to a merchant or merchant employee at the merchant location. Browser application 152 may include information for a price for the item, a discount for the item, a price change for the item, and/or other incentives for items and/or with the merchant corresponding to communication device 150 (e.g., rebates, payments, etc.). Browser application 152 may be used to set and/or determine a benefit or incentive provided to a user of a communication device (not shown). The sales data and other item data may be retrievable by the communication device 150 and/or transaction service module 120, such as requestable through an API call, retrievable from a database, and/or scraped from an online resource.

Browser application 152 may be used to establish a transaction once the user 105 associated with communication device 150 has selected one or more items for purchase. Once a payment amount is determined for the transaction for the item(s) to be purchased, browser application 152 may request payment from the user through a transaction processing flow provided by the transaction service module 120. Browser application 152 may receive payment processing information. Thus, payment provided to the merchant account, and notification of payment (or failure, for example, where there are insufficient user funds) may be sent to browser application 152. The payment may be made by transaction service module 120 on behalf of the user 105 associated with the communication device 150. In other implementations, browser application 152 may direct the user to one or more interfaces provided by transaction service module 120 for transaction processing.

Thus, browser application 152 may include one or more interfaces to engage in a transaction processing flow. In other implementations, the merchant may not view the transaction processing, which may be performed by the user 105 associated with the communication device 150. Browser application 152 may then receive the results of the transaction processing, and complete the transaction with the user 105, for example, by providing the user 105 the items for the transaction or declining the transaction where the user 105 is not authenticated or the transaction is not authorized (e.g., insufficient funds).

In one implementation, the browser application 152 includes a browser module that provides a network interface to browse information available over the network 180. For example, the browser module may be implemented, in part, as a web browser to view information available over the network 180. The browser application 152, in one implementation, includes a user interface (e.g., a web browser, a mobile application, etc.), which may be utilized by the merchant to conduct electronic transactions (e.g., selling, perform electronic payments, etc.) with the merchant server 140 over the network 180. In one aspect, sale transactions earnings may be directly and/or automatically added to an account related to the merchant via the browser application 152.

A user 105, such as a consumer, may utilize communication device 150 to perform an electronic transaction using transaction processing server 110. For example, user 105 may utilize communication device 150 to visit a merchant's web site provided by merchant server 140 or the merchant's brick-and-mortar store to browse for products offered by the merchant. Further, user 105 may utilize communication device 150 to initiate a payment transaction, receive a transaction approval request, or reply to the request. Note that a transaction, as used herein, refers to any suitable action performed using the user device, including payments, transfer of information, display of information, etc. Although only one merchant server is shown, a plurality of merchant servers may be utilized if the user is purchasing products from multiple merchants.

In one implementation, the user 105 may have identity attributes stored with the transaction service module 120, and the user may have credentials to authenticate or verify identity with the transaction service module 120. User attributes may include personal information, banking information and/or funding sources. In various aspects, the user attributes may be passed to the transaction service module 120 as part of a login, search, selection, purchase, and/or payment request, and the user attributes may be utilized by the transaction service module 120 to associate the user with one or more particular user accounts maintained by the transaction service module 120.

Figure 2:
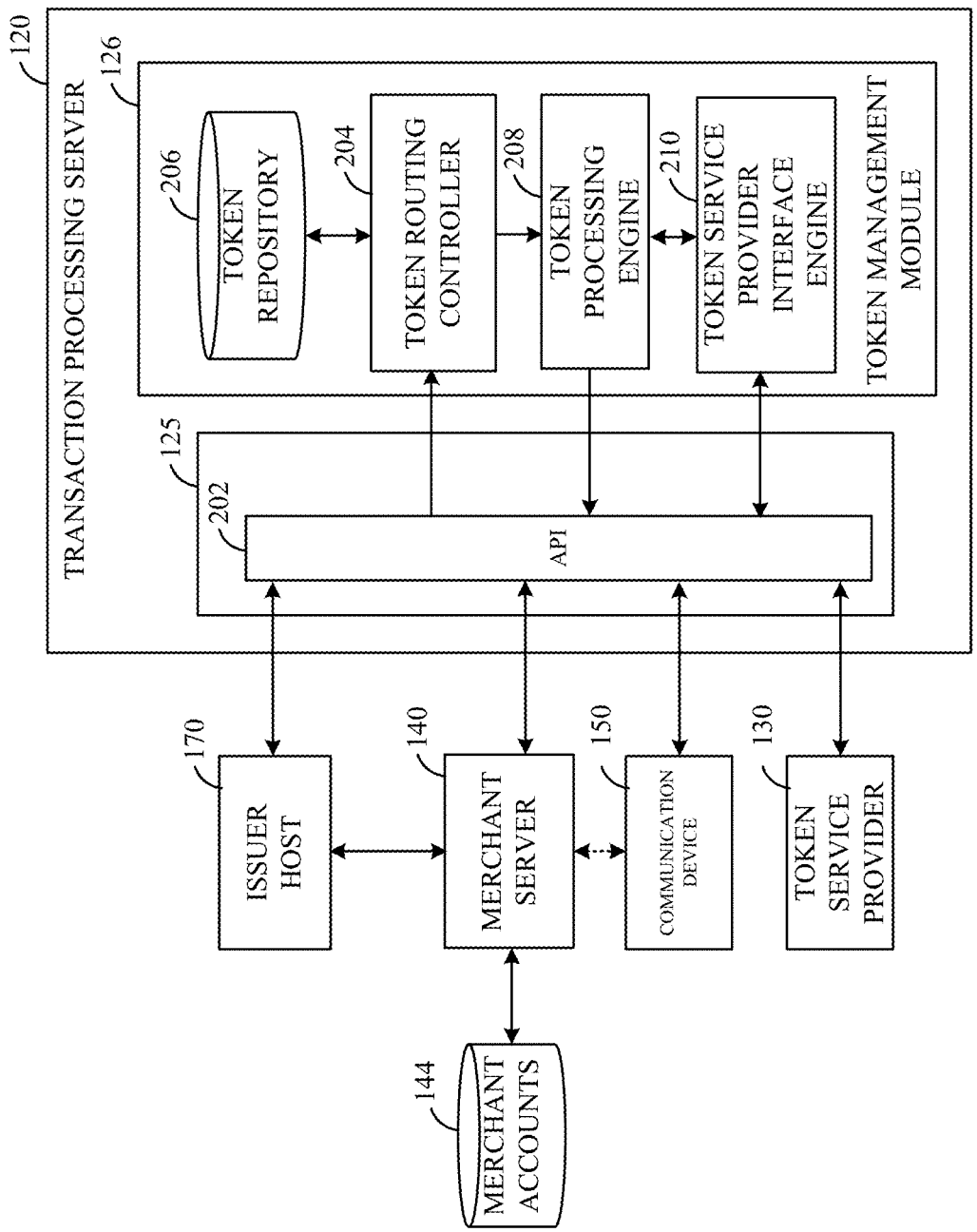
FIG. 2 illustrates a block diagram of a transaction processing server, according to an implementation of the present disclosure.

FIG. 2 illustrates a block diagram of the transaction processing server 120 of FIG. 1, according to an implementation of the present disclosure. The transaction service module 120 includes the token management module 126 communicably coupled to the network interface component 125. The token management module 126 can interact with the communication devices 150, the merchant server 140 and/or the issuer host 170 via the network interface component 125. Although FIG. 2 illustrates one issuer host 170, there may be multiple issuer hosts, including the issuer host 170, that can interact with the transaction processing server 110 to authorize a corresponding transaction instrument. In this respect, each issuer host may be associated with certain transaction instrument(s) (e.g., credit card issued by VISA™, debit card issued by PayPal®).

The token management module 126 includes a token routing controller 204, a token repository 206, a token processing engine 208, and a token service provider interface engine 210. In this regard, the network interface component 125 feeds input signaling to the token routing controller 204, which is then fed to the token processing engine 208. The token service provider interface engine 210 may have interactions with the token service provider 130 via the network interface component 125. The token routing controller 204 is coupled to the token repository 206 for performing reading and/or writing operations with the token repository 206.

In some aspects, the network interface component 125 includes API 202. In various aspect, the API 202 may correspond to a payment assessment API that is adapted to provide intelligence for digital payment transactions. A payment assessment API may be utilized by merchants that can leverage the power of a service provider network to authenticate and authorize their online transactions.

In some implementations, the token management module 126 receives, through the API 202 from the communication device 150, a transaction request identifying a request to authorize a transaction using a first transaction instrument. In one or more implementations, the token management module 126 can receive, through the API 202 from the communication device 150, a first set of tokens associated with the first transaction instrument and a second set of tokens associated with the second transaction instrument. For example, the first set of tokens may correspond to tokens issued by a credit card issuer (or bank debit card issuer) and the second set of tokens may correspond to tokens issued by a different credit card issuer. In various aspects, each of the first set of tokens and the second set of tokens includes a respective ratio of a predetermined number of transactable tokens to a predetermined number of non-transactable tokens. For example, there may be a 9:1 ratio of transactable tokens to non-transactable tokens, where nine tokens are transactable with the issuer host 170 and the one token is non-transactable for internal routing of transactable token information. In some aspects, each transactable token of the first set of tokens includes an encoded representation of the first transaction instrument and each transactable token of the second set of tokens includes an encoded representation of the second transaction instrument. In one or more implementations, the token management module 126, in coordination with the token routing controller 204, can store a first ratio of the predetermined number of transactable tokens to the predetermined number of non-transactable tokens associated with the first transaction instrument in a first data structure in the token repository 206. The token management module 126, in coordination with the token routing controller 204, also can store a second ratio of the predetermined number of transactable tokens to the predetermined number of non-transactable tokens associated with the second transaction instrument in a second data structure in the token repository 206.

In one or more implementations, the token management module 126 can receive, through the API 202 from the communication device 150, device data indicating one or more device metrics of the communication device 150. In some examples, the device data can indicate the storage capacity of the communication device 150 and/or the power consumption level (e.g., battery power level) of the communication device 150. The token management module 126 can determine whether the one or more device metrics is lesser than a predetermined threshold. For example, the token processing engine 208 can determine whether the storage capacity in the communication device 150 is running low by determining that the free storage space remaining in the communication device 150 is falling below the threshold. In other examples, the token processing engine 208 can determine whether the consumed storage space in the communication device 150 is exceeding a corresponding threshold.

The token management module 126, in coordination with the token processing engine 208, can modify the ratio of the predetermined number of transactable tokens to the predetermined number of non-transactable tokens when the one or more device metrics is determined to be lesser than the predetermined threshold. For example, if any of the device metrics falls below the threshold (e.g., battery power too low or storage almost full), then the number of tokens that the communication device 150 can handle may be decreased to facilitate the reduced performance of the communication device 150. In one or more implementations, the token management module 126 can communicate, in coordination with the token service provider interface engine 210, through the API 202 to one or more of the first remote entity or the second remote entity, a request for a new set of tokens that includes the modified ratio of the predetermined number of transactable tokens to the predetermined number of non-transactable tokens to be reissued via an asynchronous message exchange. The token management module 126 can send, through the API 202 to the communication device 150, in coordination with the token service provider interface engine 210, an asynchronous message that includes the new set of tokens.

The token management module 126 provides, through the API 202 to a first remote entity (e.g., 170), in coordination with the token service provider interface engine 210, the transaction request with a first transactable token associated with the first transaction instrument for use by the first remote entity to authorize the first transaction instrument. In various implementations, the token processing engine 208 includes multiple token processing engines, such as a first token processing engine and a second token processing engine. In some aspects, the token routing controller 204 may select a token processing engine to invoke and process any of the transactable tokens. If the first transactable token is not a valid token, the token management module 126 can receive, through the API 202 from the first remote entity, in coordination with the token service provider interface engine 210, a transaction request failed message associated with the transaction request. The transaction request failed message may indicate that the processing of the transaction using the first transactable token failed. For example, the transaction may fail authorization due to certain reasons, such as card read error, transaction processing device issues, risk related concerns, etc. In response to receipt of the transaction request failed message, the subject technology provides for relaying the transaction information via another linked transaction instrument using a specialized secured designated token, such as a non-transactable token.

The token management module 126 can associate the transaction request with a second transaction instrument by routing a non-transactable token from the first token processing engine to a second token processing engine. In this respect, the non-transactable token is routed internally within the transaction processing server 110 and is not transacted by any other third-party entity (or remote entity) outside the transaction processing server 110. In some aspects, the non-transactable token includes at least a portion of the first transactable token. In one or more aspects, the token processing engine 208, in coordination with the token routing controller 204, can route a non-transactable token stored in the token repository 206 to the token processing engine 208.

The token management module 126 provides, through the API 202 to a second remote entity (e.g., the issuer host 170), in coordination with the token service provider interface engine 210, the transaction request with a second transactable token associated with the second transaction instrument for use by the second remote entity to authorize the second transaction instrument. In this respect, the token management module 126 automatically re-attempts the transaction request with a different issuer to have the transaction processed with a different token without interaction with (or intervention by) the user 105.

The token management module 126 can receive, through the API 202 from the second remote entity, an indication associated with the transaction request based on the second transactable token. In receiving the indication, the token management module 126 can receive, through the API 202 from the second remote entity, in coordination with the token service provider interface engine 210, a transaction request successful message indicating that the transaction is authorized using the second transactable token. In turn, the token management module 126 can provide, through the API 202 to the communication device 150, a transaction completion message indicating that the transaction completed successfully.

In one or more implementations, the token management module 126 can generate transaction metadata based on the receiving of the transaction request successful message. In some aspects, the transaction metadata includes one or more of an encoded user identifier associated with the communication device 150, a session identifier associated with the transaction, the first transactable token, the second transactable token, or the non-transactable token. In some implementations, the token management module 126 can store at least a portion of the transaction metadata in the token repository 206. The token management module 126 can receive, through the API 202 from the token service provider 130, in coordination with the token service provider engine 210, one or more refresh tokens associated with the first transaction instrument and the second transaction instrument. The token management module 126 can store the one or more refresh tokens in a data structure of the token repository 206 for each of the first transaction instrument and the second transaction instrument according to a predetermined ratio of transactable tokens to non-transactable tokens based on the transaction metadata. In some aspects, the one or more refresh tokens are used to reissue one or more of the first transactable token, the second transactable token or the non-transactable token. In some aspects, the token management module 126 can provide, through the API 202 to the communication device 150, the transaction completion message that includes the one or more refresh tokens.

In some implementations, a set of transactable tokens and/or non-transactable tokens may be received by the token management module 126 from the communication device 150. Once received, the token management module 126 may load the set of transactable tokens and/or non-transactable tokens to a local storage in the token management module 126 while the communication device 150 is in contact with transaction processing server 110 over the network 180.

Figure 3:
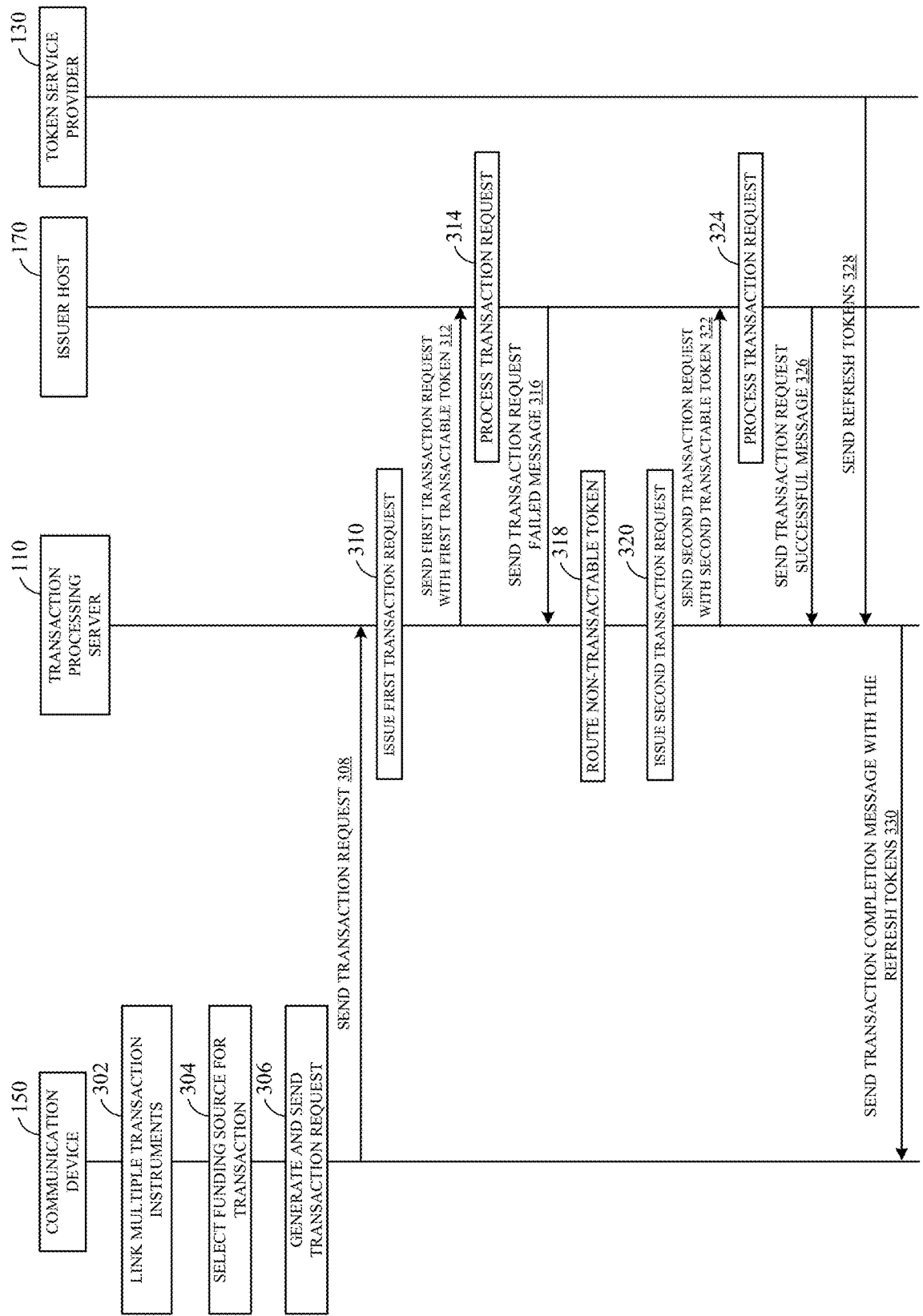
FIG. 3 illustrates a simplified message exchange in a networked system, according to an implementation of the present disclosure.

FIG. 3 illustrates a simplified message exchange in the networked system 100 of FIG. 1, according to an implementation of the present disclosure. The networked system 100 includes the communication device 150 in a message exchange with the transaction processing server 110 for authorizing a transaction. The transaction processing server 110 is in a message exchange with the issuer host 170 to authorize the requested transaction. The transaction processing server 110 can facilitate multiple transaction instruments (where a primary transaction instrument fails to authorize) by actively routing secondary transaction instrument tokens within the transaction processing server 110 that triggers an automatic re-attempt of a transaction request with the issuer host 170.

At action 302, the communication device 150 can link multiple transaction instruments to one or more user accounts of a service associated with the transaction processing server 110. At action 304, the communication device 150 can initiate a transaction request by selecting a funding source for a transaction. For example, the communication device 150 may identify one of the linked transaction instruments as the funding source for the transaction based on a predetermined ordering of the funding sources or a manual input by the user 105 associated with the communication device 150. At action 306, the communication device 150 generates the transaction request with the selected funding source. At action 308, the communication device 150 sends the transaction request to the transaction processing server 110.

At action 310, the token management module 126 of the transaction processing server 110 receives, through a network interface component with the communication device 150, the transaction request and issues a first transaction request that includes a first transactable token associated with a first transaction instrument. In some aspects, the first transaction request identifies a request to authorize a transaction associated with a communication device using the first transaction instrument.

At action 312, the token management module 126 sends, through a network interface component with the issuer host 170, the first transaction request.

At action 314, the issuer host 170 receives the first transaction request and can process the transaction using the first transactable token. The issuer host 170 attempts to authorize the first transaction instrument, however, the transaction failed to be authorized using the first transactable token. There may be certain reasons that the transaction did not complete (e.g., card read error, card read machine issues, insufficient funds, invalid user credentials, etc.). At action 316, the issuer host 170 sends a transaction request failed message.

At action 318, the token management module 126 receives, through the network interface component, the transaction request failed message and triggers an active routing of a non-transactable token internally. In some aspects, the non-transactable token includes at least a portion of the first transactable token that identifies one or more metadata attributes of the first transactable token (e.g., share risk code, transaction code, etc.).

At action 320, the token management module 126 issues a second transaction request that includes a second transactable token associated with a second transaction instrument. In some aspects, the second transaction request identifies a request to authorize the transaction using the second transaction instrument. At action 322, the token management module 126 sends, through the network interface component to the issuer host 170, the second transaction request with the second transactable token.

At action 324, the issuer host 170 receives the second transaction request and can process the transaction using the second transactable token. The issuer host 170 successfully authorizes the second transaction instrument, and the transaction completed successfully using the second transactable token. At action 326, the issuer host 170 sends a transaction request successful message to the transaction processing server 110. The token management module 126 receives, through the network interface component, the transaction request successful message.

At action 328, the token service provider 130 sends a set of refresh tokens to the transaction processing server 110. The token management module 126 receives, through the network interface component, the set of refresh tokens. In some aspects, the set of refresh tokens are associated with the first transaction instrument and the second transaction instrument. For example, the set of refresh tokens may include one or more of the first transactable token, the second transactable token or the non-transactable token to maintain a respective ratio of transactable tokens to non-transactable tokens for each transaction instrument.

At action 330, the token management module 126 sends, through the network interface component to the communication device 150, a transaction completion message with the set of refresh tokens. In this respect, the communication device 150 receives notification that the transaction was successfully authorized and receives the refresh tokens so that it can request new tokens from the token service provider 130.

Figure 4:
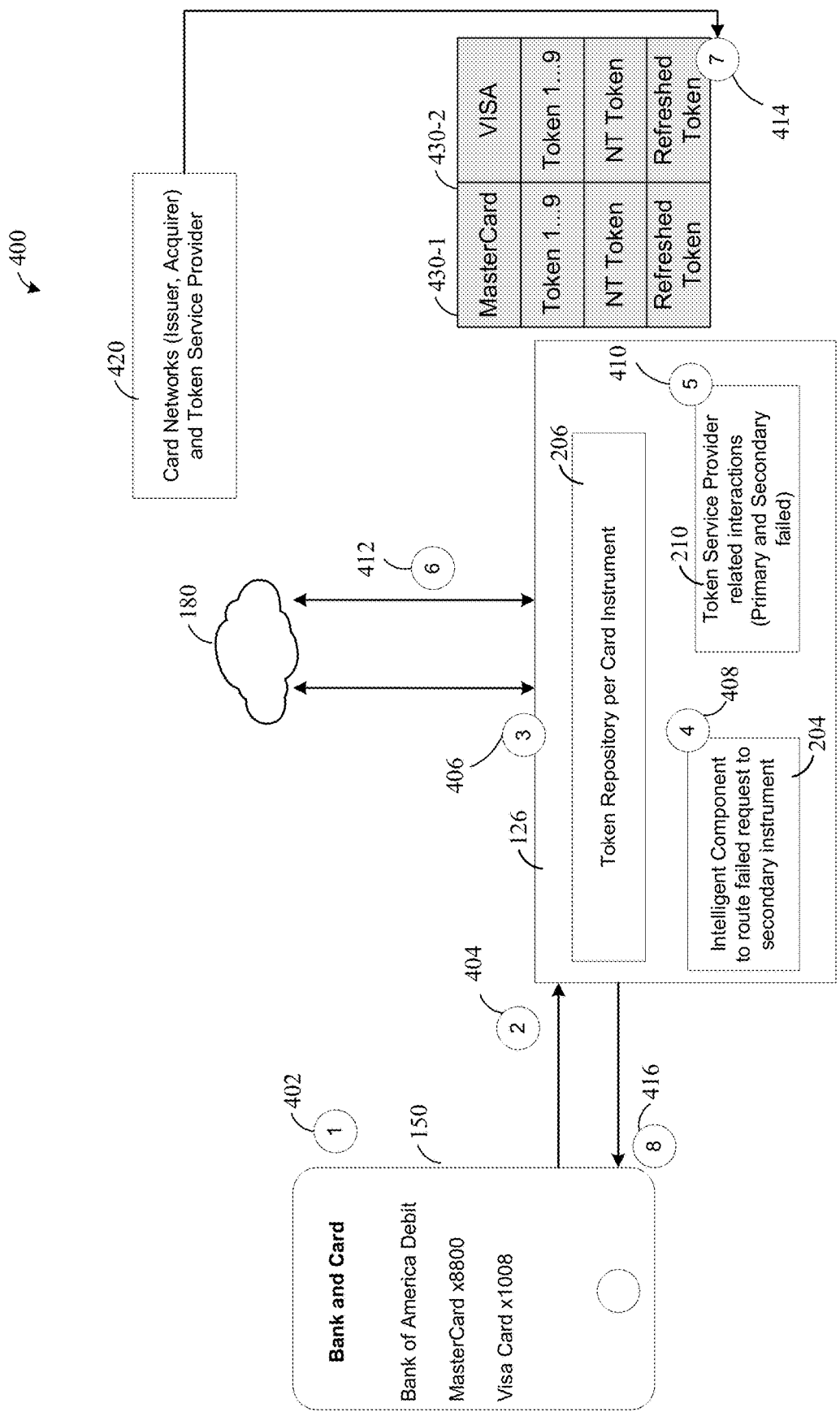
FIG. 4 conceptually illustrates an exemplary workflow of active application of secondary transaction instrument tokens, according to an implementation of the present disclosure.

FIG. 4 conceptually illustrates an exemplary workflow 400 of active application of secondary transaction instrument tokens, according to an implementation of the present disclosure. At action 402, the communication device 150 can link multiple transaction instruments to one or more user accounts of a service associated with the transaction processing server 110. The communication device 150 may display a configuration screen on a display device of the communication device 150, which can prompt a user (e.g., the user 105) to manually input one or more transaction instrument configurations for linking to the one or more user accounts. Each of the transaction instrument configurations may identify a transaction instrument (e.g., "CREDIT CARD C1 ENDING WITH 1008") with a transaction instrument source (e.g., a VISA™ credit card). For example, the user 105 can configure a first transaction instrument configuration with a corresponding link preference (e.g., "LINK WITH PAYPAL®") indicating that the user agrees to link the particular transaction instrument with a corresponding user account hosted by the transaction processing server 110, such that the particular transaction instrument of the transaction instrument configuration may be used for a current transaction request and future transaction requests by the communication device 150 associated with the linked user account. The user 105 also may configure the transaction instrument configuration with a transaction instrument ordering preference (e.g., "PREFERRED TRANSACTION METHOD") indicating that the user 105 prefers to use the particular transaction instrument of the transaction instrument configuration first as a transaction method for a transaction request. As discussed above, the selection and linking may be done by the user 105 prior to a current transaction, such as during account set up or any time subsequent, so that these steps may not be required of the user in this or a subsequent transaction where one or more transaction instruments are needed to fully fund a transaction.

Certain transaction instrument tokens can be cached (or stored) in memory of the communication device 150. At all times, about 10% of the transaction instrument tokens are assigned to a token stack of a respective transaction instrument. For example, a first transaction instrument, such as a VISA™ credit card is assigned with 10 cached transaction instrument tokens from the issuer host 170 (e.g., Bank of America®) and the token service provider 130 (e.g., VISA™ network) out of which 1 transaction instrument token is kept for contingent purposes, such as to route a transaction request to another transaction instrument within the transaction processing network. This token can be referred to as the non-transactable token.

In a use case, the user 105 associated with the communication device 150 attempts to make a payment of $100 at an airport using a payment application (e.g., the transaction application 151) with a first credit card CC1 as the selected (or preferred) transaction instrument. In this regard, the communication device 150 can initiate a transaction request by selecting a funding source for a transaction. For example, the communication device 150 may identify one of the linked transaction instruments as the funding source for the transaction based on a predetermined ordering of the funding sources or a manual input by the user 105 associated with the communication device 150.

At action 404, the token management module 126 receives, through a network interface component from the communication device 150, the transaction request. In one or more implementations, the token management module 126 can receive, through the API 202 from the communication device 150, a first set of tokens associated with the first transaction instrument and a second set of tokens associated with the second transaction instrument. For example, the first set of tokens may correspond to tokens issued by a credit card issuer (or bank debit card issuer) and the second set of tokens may correspond to tokens issued by a different credit card issuer. In various aspects, each of the first set of tokens and the second set of tokens includes a respective ratio of a predetermined number of transactable tokens to a predetermined number of non-transactable tokens. For example, there may be a 9:1 ratio of transactable tokens to non-transactable tokens, where nine tokens are transactable with the issuer host 170 and the one token is non-transactable for internal routing of transactable token information. In some aspects, each transactable token of the first set of tokens includes an encoded representation of the first transaction instrument and each transactable token of the second set of tokens includes an encoded representation of the second transaction instrument.

The token management module 126, in coordination with the token routing controller 204, can store a first ratio of the predetermined number of transactable tokens to the predetermined number of non-transactable tokens associated with the first transaction instrument in a first data structure 430-1 in the token repository 206. For example, the data structure 430-1 may store the transactable tokens of the first set of tokens in a first region of the data structure 430-1 and the non-transactable token in a second region (different from the first region) of the data structure 430-1. The token management module 126, in coordination with the token routing controller 204, also can store a second ratio of the predetermined number of transactable tokens to the predetermined number of non-transactable tokens associated with the second transaction instrument in a second data structure 430-2 in the token repository 206.

At action 406, the token management module 126 provides, through the API 202 to a first remote entity (e.g., 420) over the network 180, in coordination with the token service provider interface engine 210, the transaction request with a first transactable token associated with the first transaction instrument for use by the first remote entity to authorize the first transaction instrument. In some aspects, the first transaction request identifies a request to authorize a transaction associated with a communication device using the first transaction instrument. Referring back to the use case, the first transactable token is applied but the transaction failed due to certain reasons such as card read error, device issues, risk related concerns, etc. If the first transactable token is not a valid token, the token management module 126 can receive, through the API 202 from the first remote entity, in coordination with the token service provider interface engine 210, a transaction request failed message associated with the transaction request. The transaction request failed message may indicate that the processing of the transaction using the first transactable token failed.

At action 408, the token management module 126 actively routes a non-transactable token from the first token processing engine to a second token processing engine to associate the transaction request with a second transaction instrument. In this respect, the non-transactable token is routed internally within the transaction processing server 110 and is not transacted by any other third-party entity (or remote entity) outside the transaction processing server 110. In some aspects, the non-transactable token includes at least a portion of the first transactable token. In one or more aspects, the token processing engine 208, in coordination with the token routing controller 204, can route a non-transactable token stored in the token repository 206 to a token processing engine associated with the second transaction instrument. The token management module 126 can render the secured transaction request within the transaction processing network and apply the reissued transaction request to an issuer (e.g., PayPal®) and token service provider (e.g., MASTERCARD™ network) associated with a second transaction instrument.

At action 410, the token management module 126 provides, through the API 202 to a second remote entity (e.g., 420) over the network 180, in coordination with the token service provider interface engine 210, the transaction request with a second transactable token associated with the second transaction instrument for use by the second remote entity to authorize the second transaction instrument. In this respect, the token management module 126 automatically re-attempts the transaction request with a different issuer to have the transaction processed with a different token without interaction with (or intervention by) the user 105.

At action 412, the token management module 126 receives, through the API 202 from the second remote entity over the network 180, an indication associated with the transaction request based on the second transactable token. In receiving the indication, the token management module 126 can receive, through the API 202 from the second remote entity, in coordination with the token service provider interface engine 210, a transaction request successful message indicating that the transaction is authorized using the second transactable token. In turn, the token management module 126 can provide, through the API 202 to the communication device 150, a transaction completion message indicating that the transaction completed successfully.

At action 414, the token management module 126 can receive, through the API 202 from a token service provider (e.g., 420), in coordination with the token service provider engine 210, one or more refresh tokens associated with the first transaction instrument and the second transaction instrument. The token management module 126 can store the one or more refresh tokens in a data structure of the token repository 206 for each of the first transaction instrument and the second transaction instrument according to a predetermined ratio of transactable tokens to non-transactable tokens based on the transaction metadata. For example, the token management module 126 stores the received refresh tokens associated with the first transaction instrument in a respective storage location within the data structure 430-1. Similarly, the token management module 126 stores the received refresh tokens associated with the second transaction instrument in a respective storage location within the data structure 430-2. In some aspects, the one or more refresh tokens are used to reissue one or more of the first transactable token, the second transactable token or the non-transactable token.

At action 416, the token management module 126 can provide, through the API 202 to the communication device 150, a transaction completion message indicating that the transaction completed successfully. In some aspects, the token management module 126 provides, through the API 202 to the communication device 150, the transaction completion message that includes the one or more refresh tokens.

Figure 5:
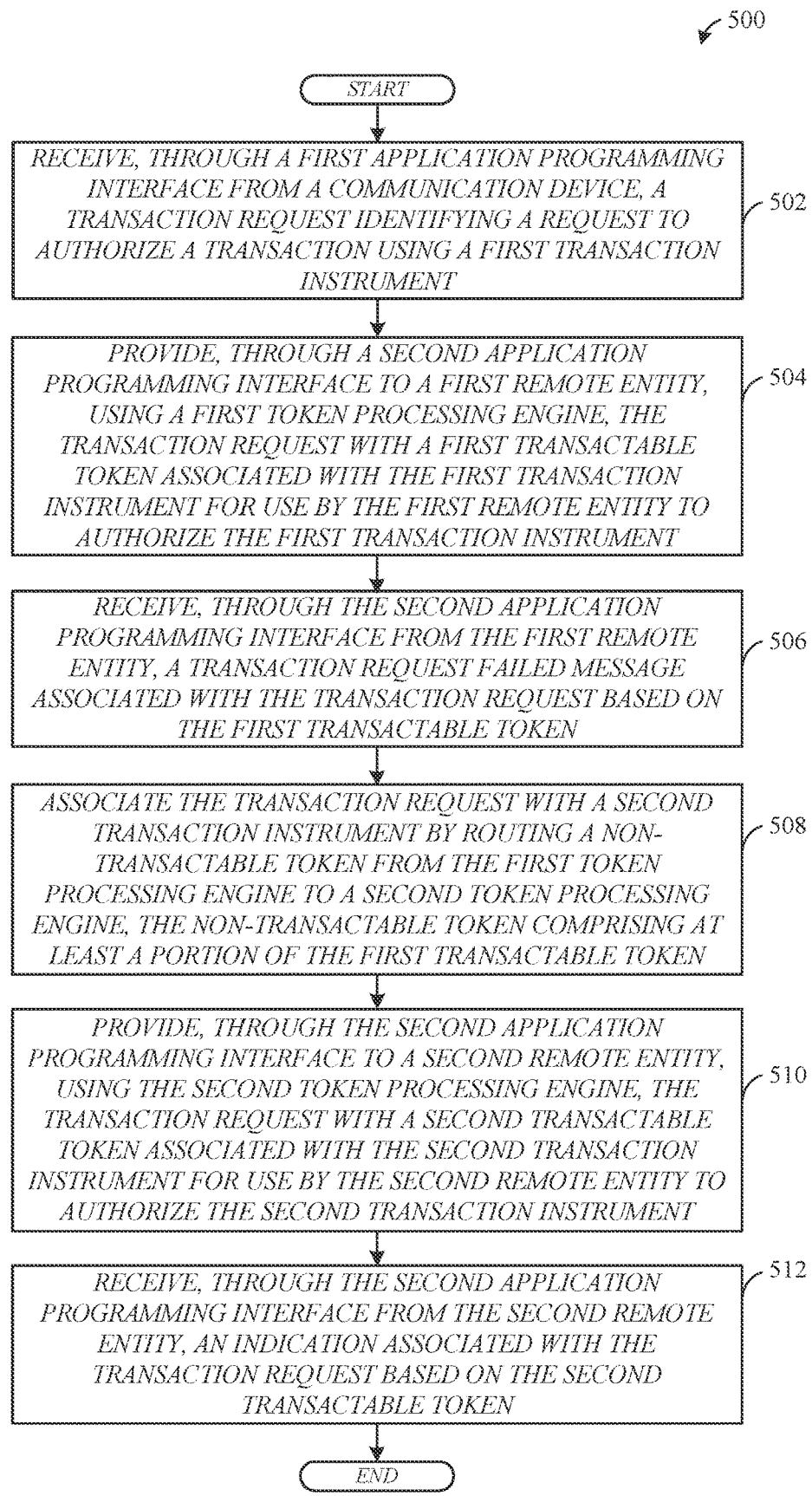
FIG. 5 is a flowchart of an example process of an active application of secondary transaction instrument tokens, according to an implementation of the present disclosure.

FIG. 5 is a flowchart of an example process 500 of an active application of secondary transaction instrument tokens, according to an implementation of the present disclosure. One or more of the steps 502-512 of process 500 may be implemented, at least in part, in the form of executable code stored on non-transitory, tangible, machine-readable media that when run by one or more processors may cause the one or more processors to perform one or more of the steps 502-512. Some examples of computing devices, such as computer system 700 may include non-transitory, tangible, machine readable media that include executable code that when run by one or more processors (e.g., processor 712) may cause the one or more processors to perform the steps of process 500. As illustrated, the process 500 includes a number of enumerated steps, but aspects of the process 500 may include additional steps before, after, and in between the enumerated steps. In some aspects, one or more of the enumerated steps may be omitted or performed in a different order.

The process 500 begins at step 502, where the token management module 126 receives, through a network interface component from the communication device 150, a transaction request identifying a request to authorize a transaction using a first transaction instrument. In one or more implementations, the token management module 126 can receive, through the network interface component from the communication device, a first set of tokens associated with the first transaction instrument and a second set of tokens associated with the second transaction instrument. In various aspects, each of the first set of tokens and the second set of tokens includes a respective ratio of a predetermined number of transactable tokens to a predetermined number of non-transactable tokens. In some aspects, each transactable token of the first set of tokens includes an encoded representation of the first transaction instrument and each transactable token of the second set of tokens includes an encoded representation of the second transaction instrument. In one or more implementations, the token management module 126 can store a first ratio of the predetermined number of transactable tokens to the predetermined number of non-transactable tokens associated with the first transaction instrument in a first data structure. The token management module 126 can store a second ratio of the predetermined number of transactable tokens to the predetermined number of non-transactable tokens associated with the second transaction instrument in a second data structure.

In one or more implementations, the token management module 126 can receive, through the network interface component from the communication device, device data indicating one or more device metrics of the communication device. In some examples, the device data can indicate the storage capacity of the communication device 150 and/or the power consumption level (e.g., battery power level) of the communication device 150. The token management module 126 can determine whether the one or more device metrics is lesser than a predetermined threshold. The token management module 126 can modify the ratio of the predetermined number of transactable tokens to the predetermined number of non-transactable tokens when the one or more device metrics is determined to be lesser than the predetermined threshold. For example, if any of the device metrics falls below the threshold (e.g., battery power too low or storage almost full), then the number of tokens that the communication device 150 can handle may be decreased to facilitate the reduced performance of the communication device 150. In one or more implementations, the token management module 126 can communicate, through the network interface component to one or more of the first remote entity or the second remote entity, a request for a new set of tokens comprising the modified ratio of the predetermined number of transactable tokens to the predetermined number of non-transactable tokens to be reissued via an asynchronous message exchange. The token management module 126 can send, through the network interface component to the communication device, an asynchronous message comprising the new set of tokens.

Next, at step 504, the token management module 126 provides, through a network interface component to a first remote entity, using a first token processing engine, the transaction request with a first transactable token associated with the first transaction instrument for use by the first remote entity to authorize the first transaction instrument.

Subsequently, at step 506, the token management module 126 receives, through the network interface component from the first remote entity, a transaction request failed message associated with the transaction request based on the first transactable token.

Next, at step 508, the token management module 126 associating the transaction request with a second transaction instrument by routing a non-transactable token from the first token processing engine to a second token processing engine, the non-transactable token comprising at least a portion of the first transactable token.

At step 510, the token management module 126 provides, through the network interface component to a second remote entity, using the second token processing engine, the transaction request with a second transactable token associated with the second transaction instrument for use by the second remote entity to authorize the second transaction instrument.

Next, at step 512, the token management module 126 receiving, through the network interface component from the second remote entity, an indication associated with the transaction request based on the second transactable token. In receiving the indication, the token management module 126 can receive, through the network interface component from the second remote entity, a transaction request successful message indicating that the transaction is authorized using the second transactable token. In turn, the token management module 126 provide, through the network interface component to the communication device, a transaction completion message indicating that the transaction completed successfully.

In one or more implementations, the token management module 126 can receive, through the network interface component from a token service provider entity, one or more refresh tokens associated with the first transaction instrument and the second transaction instrument. In some aspects, the token management module 126 can provide the transaction completion message includes providing, through the network interface component to the communication device, the transaction completion message comprising the one or more refresh tokens.

In one or more implementations, the token management module 126 can generate transaction metadata based on the receiving of the transaction request successful message. In some aspects, the transaction metadata includes one or more of an encoded user identifier associated with the communication device, a session identifier associated with the transaction, the first transactable token, the second transactable token, or the non-transactable token. The token management module 126 can receive, through the network interface component from a token service provider entity, one or more refresh tokens associated with the first transaction instrument and the second transaction instrument. The token management module 126 can store the one or more refresh tokens in a data structure for each of the first transaction instrument and the second transaction instrument according to a predetermined ratio of transactable tokens to non-transactable tokens based on the transaction metadata. In some aspects, the one or more refresh tokens are used to reissue one or more of the first transactable token, the second transactable token or the non-transactable token.

Figure 6:
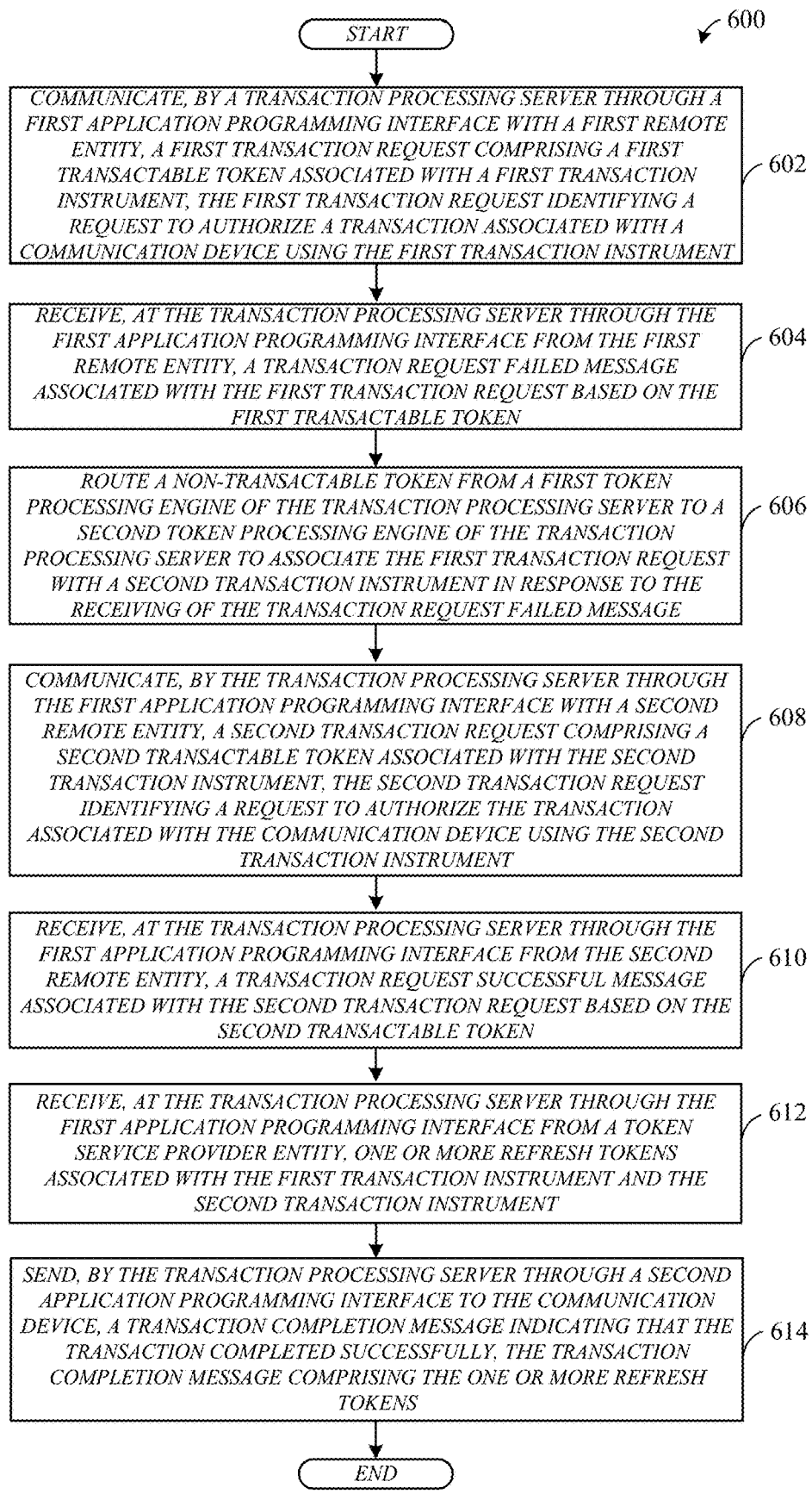
FIG. 6 is a flowchart of another example process of an active application of secondary transaction instrument tokens, according to an implementation of the present disclosure.

FIG. 6 is a flowchart of an example process 600 of an active application of secondary transaction instrument tokens, according to an implementation of the present disclosure. One or more of the steps 602-614 of process 600 may be implemented, at least in part, in the form of executable code stored on non-transitory, tangible, machine-readable media that when run by one or more processors may cause the one or more processors to perform one or more of the steps 602-614. Some examples of computing devices, such as computer system 700 may include non-transitory, tangible, machine readable media that include executable code that when run by one or more processors (e.g., processor 712) may cause the one or more processors to perform the steps of process 600. As illustrated, the process 600 includes a number of enumerated steps, but aspects of the process 600 may include additional steps before, after, and in between the enumerated steps. In some aspects, one or more of the enumerated steps may be omitted or performed in a different order.

The process 600 begins at step 602, where the token management module 126 communicates, through a network interface component with a first remote entity, a first transaction request that includes a first transactable token associated with a first transaction instrument. In some aspects, the first transaction request identifies a request to authorize a transaction associated with a communication device using the first transaction instrument.

Next, at step 604, the token management module 126 receives, through the network interface component from the first remote entity, a transaction request failed message associated with the first transaction request based on the first transactable token.

Subsequently, at step 606, the token management module 126 routes a non-transactable token from a first token processing engine of the transaction processing server to a second token processing engine of the transaction processing server to associate the first transaction request with a second transaction instrument in response to the receiving of the transaction request failed message. In some aspects, the non-transactable token includes at least a portion of the first transactable token.

Next, at step 608, the token management module 126 communicates, through the network interface component with a second remote entity, a second transaction request comprising a second transactable token associated with the second transaction instrument. In some aspects, the second transaction request identifies a request to authorize the transaction associated with the communication device using the second transaction instrument.

At step 610, the token management module 126 receives, through the network interface component from the second remote entity, a transaction request successful message associated with the second transaction request based on the second transactable token.

Next, at step 612, the token management module 126 receives, through the network interface component from a token service provider entity, one or more refresh tokens associated with the first transaction instrument and the second transaction instrument.

Subsequently, at step 614, the token management module 126 sends, through a network interface component to the communication device, a transaction completion message indicating that the transaction completed successfully. In some aspects, the transaction completion message includes the one or more refresh tokens.

Figure 7:
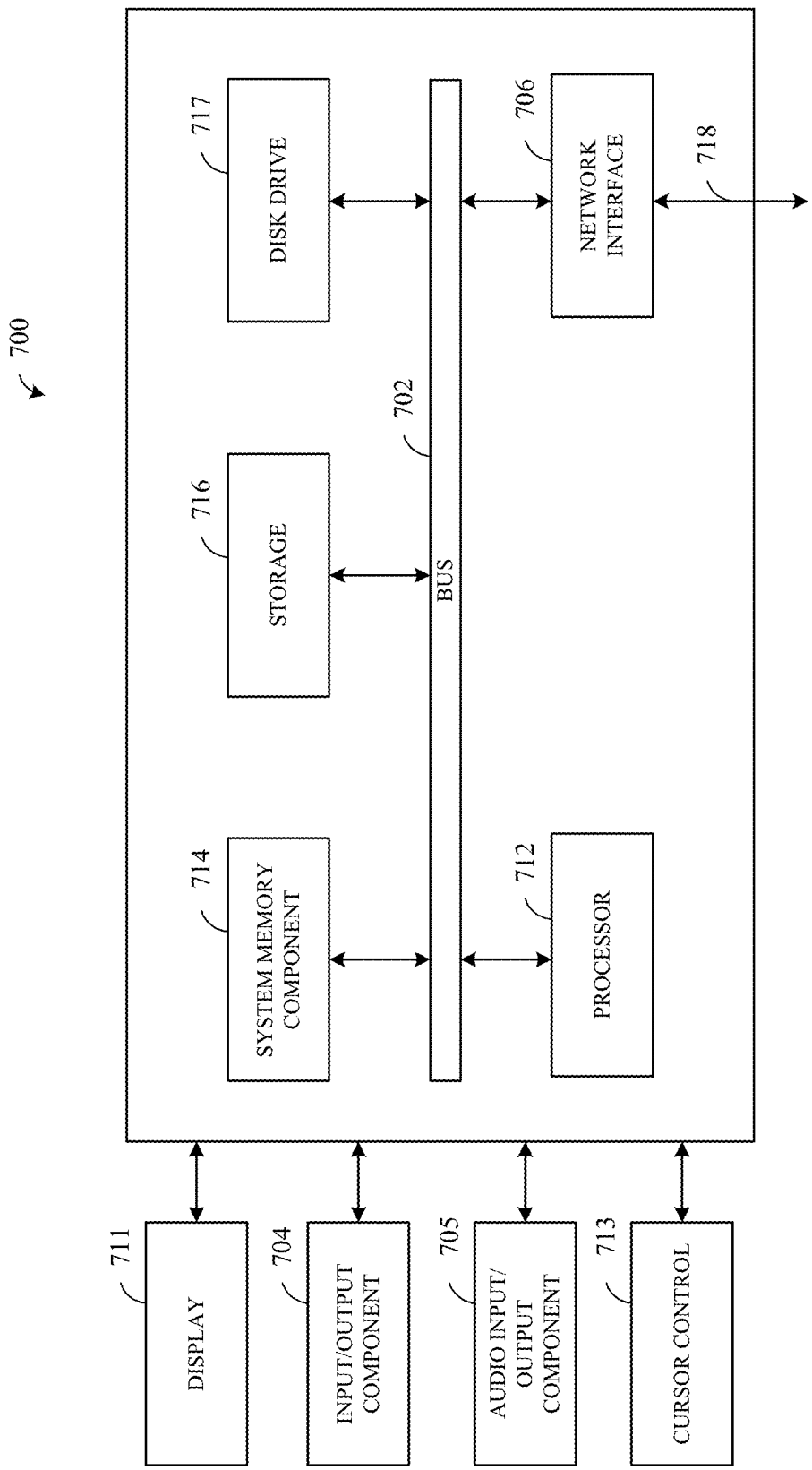
FIG. 7 is a block diagram of a computer system suitable for implementing one or more components in FIG. 1, according to an implementation.

FIG. 7 is a block diagram of a computer system 700 suitable for implementing one or more components in FIG. 1, according to an implementation. In various implementations, a computing device may include a personal computing device e.g., smart phone, a computing tablet, a personal computer, laptop, a wearable computing device such as glasses or a watch, Bluetooth device, key FOB, badge, etc.) capable of communicating with the network. The transaction processing server 110 may utilize a network computing device (e.g., a network server) capable of communicating with the network 180. It should be appreciated that each of the devices utilized by users and service providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons, image, or links, and/or moving one or more images, etc., and sends a corresponding signal to bus 702. I/O component 704 may also include an output component, such as a display 711 and a cursor control 713 (such as a keyboard, keypad, mouse, etc.). An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as another communication device, service device, or a service provider server via network 180. In one implementation, the transmission is wireless, although other transmission mediums and methods may also be suitable. One or more processors 712, which can be a micro-controller, digital signal processor (DSP), or other processing component, processes these various signals, such as for display on computer system 700 or transmission to other devices via a communication link 718. Processor(s) 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor(s) 712 and other components by executing one or more sequences of instructions contained in system memory component 714. Logic may be encoded in a computer readable medium, which may refer to any medium that participates in providing instructions to processor(s) 712 for execution. Such a medium may take many forms, including but not limited to, non-volatile media, volatile media, and transmission media. In various implementations, non-volatile media includes optical or magnetic disks, volatile media includes dynamic memory, such as system memory component 714, and transmission media includes coaxial cables, copper wire, and fiber optics, including wires that include bus 702. In one implementation, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various implementations of the present disclosure, execution of instruction sequences to practice the present disclosure may be performed by computer system 700. In various other implementations of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various implementations provided by the present disclosure may be implemented using hardware, software, or combinations of hardware and software. Also, where applicable, the various hardware components and/or software components set forth herein may be combined into composite components that include software, hardware, and/or both without departing from the spirit of the present disclosure. Where applicable, the various hardware components and/or software components set forth herein may be separated into sub-components that include software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems that include one or more memories storing various information described herein and one or more processors coupled to the one or more memories and a network, wherein the one or more processors are operable to perform steps as described herein, as non-transitory machine-readable medium that includes a plurality of machine-readable instructions which, when executed by one or more processors, are adapted to cause the one or more processors to perform a method that includes steps described herein, and methods performed by one or more devices, such as a hardware processor, user device, server, and other devices described herein.

The foregoing disclosure is not intended to limit the present disclosure to the precise forms or particular fields of use disclosed. As such, it is contemplated that various alternate implementations and/or modifications to the present disclosure, whether explicitly described or implied herein, are possible in light of the disclosure. Having thus described implementations of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory; and
   one or more hardware processors coupled to the non-transitory memory and configured to execute instructions from the non-transitory memory to cause the system to perform operations comprising:
   receiving, through a network interface component from a communication device, a transaction request identifying a request to authorize a transaction using a first transaction instrument;
   providing, through the network interface component to a first remote entity, using a first token processing engine, the transaction request with a first transactable token associated with the first transaction instrument for use by the first remote entity to authorize the first transaction instrument;
   receiving, through the network interface component from the first remote entity, a transaction request failed message associated with the transaction request based on the first transactable token;
   associating the transaction request with a second transaction instrument by routing a non-transactable token from the first token processing engine to a second token processing engine, the non-transactable token comprising at least a portion of the first transactable token;
   providing, through the network interface component to a second remote entity, using the second token processing engine, the transaction request with a second transactable token associated with the second transaction instrument for use by the second remote entity to authorize the second transaction instrument; and
   receiving, through the network interface component from the second remote entity, an indication associated with the transaction request based on the second transactable token.

2. The system of claim 1, wherein the receiving the indication comprises:

receiving, through the network interface component from the second remote entity, a transaction request successful message indicating that the transaction is authorized using the second transactable token, wherein the operations further comprise:
  providing, through the network interface component to the communication device, a transaction completion message indicating that the transaction completed successfully.

3. The system of claim 2, wherein the operations further comprise:
  receiving, through the network interface component from a token service provider entity, one or more refresh tokens associated with the first transaction instrument and the second transaction instrument,
  wherein the providing the transaction completion message comprises providing, through the network interface component to the communication device, the transaction completion message comprising the one or more refresh tokens.

4. The system of claim 2, wherein the operations further comprise:
  generating transaction metadata based on the receiving of the transaction request successful message, the transaction metadata comprising one or more of an encoded user identifier associated with the communication device, a session identifier associated with the transaction, the first transactable token, the second transactable token, or the non-transactable token;
  receiving, through the network interface component from a token service provider entity, one or more refresh tokens associated with the first transaction instrument and the second transaction instrument; and
  storing the one or more refresh tokens in a data structure for each of the first transaction instrument and the second transaction instrument according to a predetermined ratio of transactable tokens to non-transactable tokens based on the transaction metadata, the one or more refresh tokens being used to reissue one or more of the first transactable token, the second transactable token or the non-transactable token.

5. The system of claim 1, wherein the operations further comprise:
  receiving, through the network interface component from the communication device, a first set of tokens associated with the first transaction instrument and a second set of tokens associated with the second transaction instrument, wherein each of the first set of tokens and the second set of tokens includes a respective ratio of a predetermined number of transactable tokens to a predetermined number of non-transactable tokens, wherein each transactable token of the first set of tokens includes an encoded representation of the first transaction instrument and each transactable token of the second set of tokens includes an encoded representation of the second transaction instrument.

6. The system of claim 5, wherein the operations further comprise:
  receiving, through the network interface component from the communication device, device data indicating one or more device metrics of the communication device;
  determining whether the one or more device metrics is lesser than a predetermined threshold; and
  modifying the ratio of the predetermined number of transactable tokens to the predetermined number of non-transactable tokens when the one or more device metrics is determined to be lesser than the predetermined threshold.

7. The system of claim 6, wherein the operations further comprise:
  communicating, through the network interface component to one or more of the first remote entity or the second remote entity, a request for a new set of tokens comprising the modified ratio of the predetermined number of transactable tokens to the predetermined number of non-transactable tokens to be reissued via an asynchronous message exchange; and
  sending, through the network interface component to the communication device, an asynchronous message comprising the new set of tokens.

8. The system of claim 5, wherein the operations further comprise:
  storing a first ratio of the predetermined number of transactable tokens to the predetermined number of non-transactable tokens associated with the first transaction instrument in a first data structure; and
  storing a second ratio of the predetermined number of transactable tokens to the predetermined number of non-transactable tokens associated with the second transaction instrument in a second data structure.

9. The system of claim 5, wherein the operations further comprise:
  receiving, through the network interface component from a token service provider entity, one or more refresh tokens associated with the first transaction instrument and the second transaction instrument to maintain the ratio of the predetermined number of transactable tokens to the predetermined number of non-transactable tokens in each of the first set of tokens and the second set of tokens.

10. A method, comprising:
  communicating, by a transaction processing server through a network interface component with a first remote entity, a first transaction request comprising a first transactable token associated with a first transaction instrument, the first transaction request identifying a request to authorize a transaction associated with a communication device using the first transaction instrument;
  receiving, at the transaction processing server through the network interface component from the first remote entity, a transaction request failed message associated with the first transaction request based on the first transactable token;
  routing a non-transactable token from a first token processing engine of the transaction processing server to a second token processing engine of the transaction processing server to associate the first transaction request with a second transaction instrument in response to the receiving of the transaction request failed message, the non-transactable token comprising at least a portion of the first transactable token;
  communicating, by the transaction processing server through the network interface component with a second remote entity, a second transaction request comprising a second transactable token associated with the second transaction instrument, the second transaction request identifying a request to authorize the transaction associated with the communication device using the second transaction instrument;
  receiving, at the transaction processing server through the network interface component from the second remote entity, a transaction request successful message associated with the second transaction request based on the second transactable token;

receiving, at the transaction processing server through the network interface component from a token service provider entity, one or more refresh tokens associated with the first transaction instrument and the second transaction instrument; and sending, by the transaction processing server through a network interface component to the communication device, a transaction completion message indicating that the transaction completed successfully, the transaction completion message comprising the one or more refresh tokens.

11. The method of claim 10, further comprising:
receiving, at the transaction processing server through the network interface component from the communication device, a first set of tokens associated with the first transaction instrument and a second set of tokens associated with the second transaction instrument, wherein each of the first set of tokens and the second set of tokens includes a respective ratio of a predetermined number of transactable tokens to a predetermined number of non-transactable tokens, wherein each transactable token of the first set of tokens includes an encoded representation of the first transaction instrument and each transactable token of the second set of tokens includes an encoded representation of the second transaction instrument.

12. The method of claim 11, further comprising:
receiving, at the transaction processing server through the network interface component from the communication device, device data indicating one or more device metrics of the communication device;

determining, by the transaction processing server, whether the one or more device metrics is lesser than a predetermined threshold; and modifying, by the transaction processing server, the ratio of the predetermined number of transactable tokens to the predetermined number of non-transactable tokens when the one or more device metrics is determined to be lesser than the predetermined threshold.

13. The method of claim 12, further comprising:
communicating, by the transaction processing server through the network interface component to one or more of the first remote entity or the second remote entity, a request for a new set of tokens comprising the modified ratio of the predetermined number of transactable tokens to the predetermined number of non-transactable tokens to be reissued via an asynchronous message exchange; and communicating, by the transaction processing server through the network interface component to the communication device, an asynchronous message comprising the new set of tokens.

14. The method of claim 11, further comprising:
storing a first ratio of the predetermined number of transactable tokens to the predetermined number of non-transactable tokens associated with the first transaction instrument in a first data structure; and storing a second ratio of the predetermined number of transactable tokens to the predetermined number of non-transactable tokens associated with the second transaction instrument in a second data structure.

15. A non-transitory machine-readable medium having stored thereon machine-readable instructions executable to cause a machine to perform operations comprising:

receiving, through a network interface component from a communication device, a transaction request identifying a request to authorize a transaction using a first transaction instrument;

providing, through a network interface component to a first remote entity, using a first token processing engine, the transaction request with a first transactable token associated with the first transaction instrument for use by the first remote entity to authorize the first transaction instrument;

receiving, through a network interface component from the first remote entity, a transaction request failed message associated with the transaction request based on the first transactable token;

providing, through the network interface component to a second remote entity, using a second token processing engine, the transaction request with a second transactable token associated with a second transaction instrument for use by the second remote entity to authorize the second transaction instrument, based on a non-transactable token routed from the first token processing engine;

receiving, through the network interface component from the second remote entity, a transaction request successful message associated with the transaction request based on the second transactable token;

acquiring, through the network interface component from a token service provider entity, one or more refresh tokens associated with the first transaction instrument and the second transaction instrument; and communicating, through the network interface component with the communication device, a transaction completion message indicating that the transaction completed successfully, the transaction completion message comprising the one or more refresh tokens.

16. The non-transitory machine-readable medium of claim 15, wherein the operations further comprise:
routing a non-transactable token from a first token processing engine to a second token processing engine to associate the transaction request with a second transaction instrument, the non-transactable token comprising at least a portion of the first transactable token.

17. The non-transitory machine-readable medium of claim 15, wherein the operations further comprise:
receiving, through the network interface component from the communication device, a first set of tokens associated with the first transaction instrument and a second set of tokens associated with the second transaction instrument, wherein each of the first set of tokens and the second set of tokens includes a respective ratio of a predetermined number of transactable tokens to a predetermined number of non-transactable tokens, wherein each transactable token of the first set of tokens includes an encoded representation of the first transaction instrument and each transactable token of the second set of tokens includes an encoded representation of the second transaction instrument.

18. The non-transitory machine-readable medium of claim 17, wherein the operations further comprise:
receiving, through the network interface component from the communication device, device data indicating one or more device metrics of the communication device;

determining whether the one or more device metrics is lesser than a predetermined threshold; and modifying the ratio of the predetermined number of transactable tokens to the predetermined number of non-transactable tokens when the one or more device metrics is determined to be lesser than the predetermined threshold.

19. The non-transitory machine-readable medium of claim 18, wherein the operations further comprise:

communicating, through the network interface component to one or more of the first remote entity or the second remote entity, a request for a new set of tokens comprising the modified ratio of the predetermined number of transactable tokens to the predetermined number of non-transactable tokens to be reissued via an asynchronous message exchange; and sending, through the network interface component to the communication device, an asynchronous message comprising the new set of tokens.

20. The non-transitory machine-readable medium of claim 17, wherein the operations further comprise:

storing a first ratio of the predetermined number of transactable tokens to the predetermined number of non-transactable tokens associated with the first transaction instrument in a first data structure; and storing a second ratio of the predetermined number of transactable tokens to the predetermined number of non-transactable tokens associated with the second transaction instrument in a second data structure.

* * * * *